United States Patent [19]
Kalmokoff et al.

[11] 3,951,352
[45] Apr. 20, 1976

[54] MAGNETIC TAPE GUIDANCE DEVICE

[75] Inventors: Donald M. Kalmokoff, North Vancouver; Dominic R. DiPalma, Vancouver; David J. Glasstetter, Richmond; Jack K. Gordon, Vancouver, all of Canada

[73] Assignee: Western Broadcasting Co., Ltd., Vancouver, Canada

[22] Filed: Aug. 19, 1974

[21] Appl. No.: 498,660

Related U.S. Application Data

[63] Continuation of Ser. No. 269,929, July 10, 1972, abandoned.

[52] U.S. Cl. .................................. 242/55.19 A
[51] Int. Cl.[2] .................................. B65H 17/48
[58] Field of Search ............ 242/55.19 A, 55.19 R, 242/197, 198, 200; 352/128, 72, 78; 360/93

[56] References Cited
UNITED STATES PATENTS

| | | | |
|---|---|---|---|
| 2,778,880 | 1/1957 | Eash | 242/55.19 A |
| 3,161,362 | 12/1964 | Smith | 242/55.19 A |
| 3,269,671 | 8/1966 | Cole, Jr. | 242/55.19 A |
| 3,305,296 | 2/1967 | Nicosia | 242/55.19 A X |
| 3,343,759 | 9/1967 | Kallay | 242/55.19 A |
| 3,481,551 | 12/1969 | Steelman | 242/55.19 A |
| 3,563,482 | 2/1971 | Auld | 242/55.19 A |
| 3,583,652 | 6/1971 | Merry | 242/55.19 A |
| 3,637,151 | 1/1972 | Skwarek | 242/55.19 A |
| 3,788,574 | 1/1974 | Wakeman et al. | 242/55.19 A |

*Primary Examiner*—Leonard D. Christian
*Attorney, Agent, or Firm*—Fetherstonhaugh & Co.

[57] ABSTRACT

A magnetic tape guidance device, which may be in the form of a cartridge, for use with a record/playback machine, so that the tape is drawn past record/playback heads on the machine by drive means also provided on the machine. The device includes a precision guide post which guides tape towards the record/playback heads and the drive means, and a flat second guide at right angles to the axis of the cylindrical guide post which maintains the height of the tape correctly in relation to the record/playback heads, the device also including a tape tensioning device which applies frictional resistance to the tape prior to movement around the guide post such that wrap of the tape around the guidepost is symmetrical. In a variant, an endless tape cartridge is provided in which the function of providing symmetrical tension is combined with the function of drawing tape from the center of the reel, the tape then being fed around the guide post, over the head or heads, and through the drive means, after which it is rewound on the reel. In all embodiments the device will combine with a machine to create a true open-loop head configuration, in which a single precision guide feeds tape across heads to a drive mechanism, without need of additional guidance.

19 Claims, 11 Drawing Figures

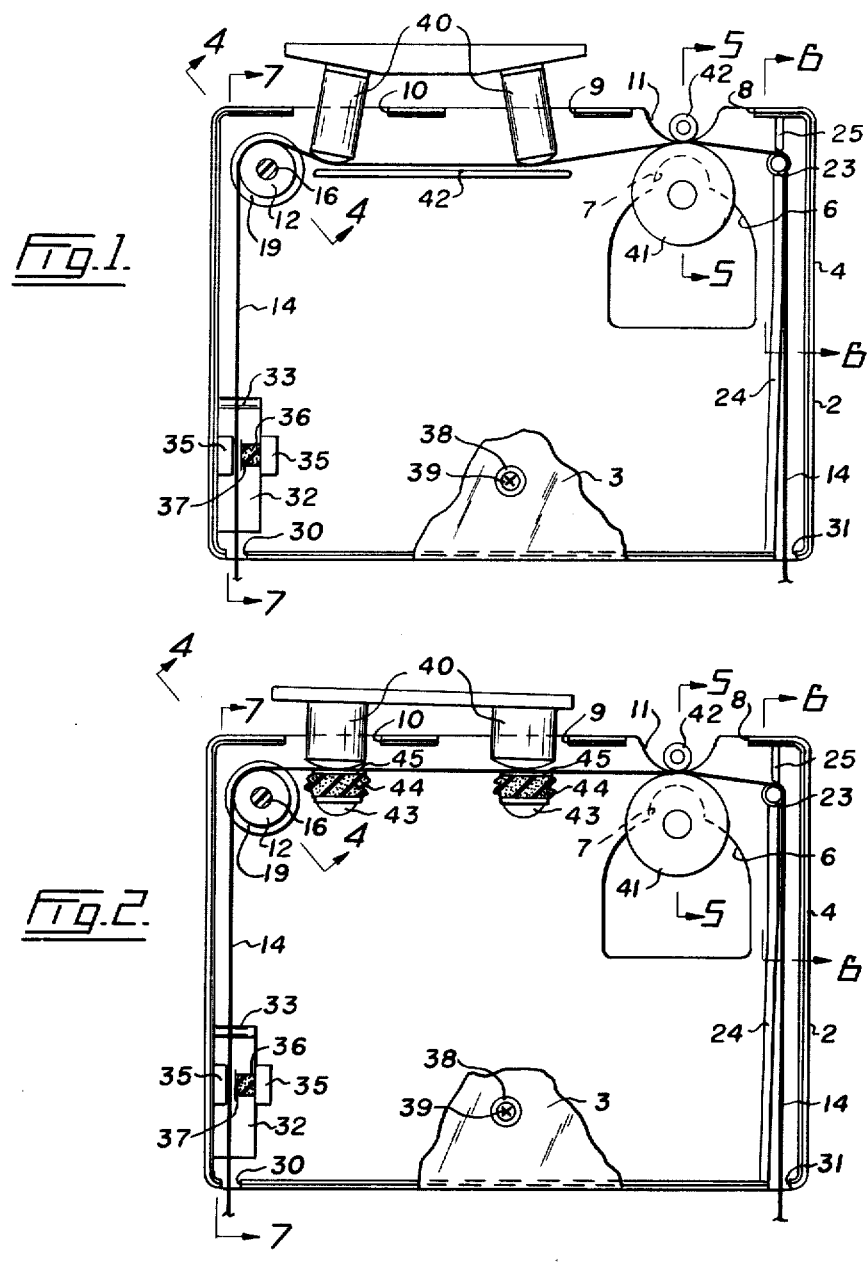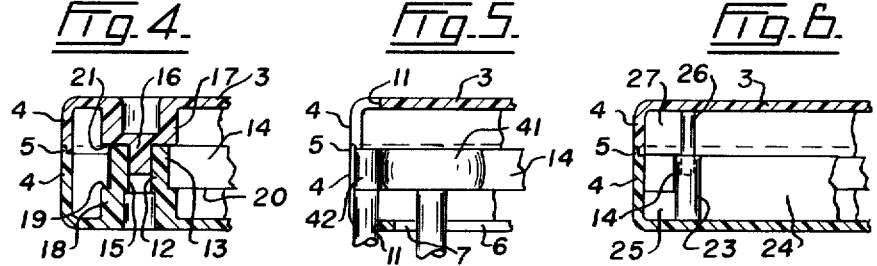

MAGNETIC TAPE GUIDANCE DEVICE

This is a continuation of application Ser. No. 269,929, filed July 10, 1972, now abandoned.

The invention relates to a magnetic tape guidance device for use with a recording/playback machine.

When a recording/playback machine is used in its recording mode, the record head may be considered as a magnetic printing device. Its gap prints transverse lines of magnetic flux upon the tape, and if each transverse line is presumed to be infinitely narrow, then a wave form may be considered to be made up of a continuous series of such lines, with flux densities varying according to the nature of the wave form. For optimum recording the tape must be accurately aligned with the head, perfect alignment being the condition where each transverse line is printed by the head at exactly 90° to the longitudinal axis of the tape. On playback, each line must register exactly with the gap in the playback head if it is to be read correctly.

Cartridge guidance devices for use in monophonic recording or playback have been characterized by alignment error (angular displacement from the perpendicular relationship referred to above). Although such error does affect the quality of the signal when reproduced from the tape, it has been tolerated in the past as unavoidable in cartridge systems. Degradation has also been masked by the quality limitations of mono devices such as AM receivers.

However, in the case of multi-track recording (stereophonic, quadraphonic, etc.), serious degradation can result upon playback. Alignment error in multi-track recording manifests itself as an overall change in the phase relationship between tracks as read by the playback head and the highest acceptable limit is a difference between tracks of about 0.1 wavelength at the highest frequency of concern.

Thus, for example, in the case of a guidance device for use in broadcasting, as defined in the "Standards of Magnetic Tape Cartridge Systems" issued by the National Association of Broadcasters, the tape speed is 7.5 inches per second and the top frequency is 15 kilo-Hertz. At this frequency, the wavelength is 0.0005 inches and the maximum permissible system error is therefore a displacement of 0.00005 inches over the standard span of 0.1 inches between stereo tracks, giving an angle of 0.03 degrees. Thus, for proper reproduction, the cumulative error in recording on a moving tape, storing a tape, and playing it back on a different machine should be limited to a maximum registration error at the playback head of 0.03 degrees.

In earlier magnetic tape guidance devices, for example the endless tape cartridge disclosed in U.S. Pat. No. 3,161,362 to Smith, the problem of alignment as explained above has not been taken into account in the design. The Smith construction utilizes roller guides for the tape and applies constraints to the tape during its movement along the path of contact with the record/playback heads of the machine.

The present invention lies in the recognition of the conditions necessary for tape guidance in order to achieve the standard of accuracy necessary for multi-track recording and playback.

The invention therefore provides a magnetic tape guidance device for co-operating engagement with a recording/playback machine having no means for tape guidance, said device comprising a housing adapted to be located in a predetermined position in the machine and formed for the reception of record/playback head means and tape drive means of the machine into engagement with magnetic tape within the housing, fixed first guide means in said housing and defining a wrap around guide surface for guiding tape from a feedpath into a head engagement path extending past the head means to the drive means, with said housing defining a tape engagement zone for the record/playback head means which is free of tape guidance elements between said fixed first guide means and the position of engagement by the tape drive means, and fixed second guide means in said housing coincident along the tape path with said first guide means and defining a flat guide surface extending in a plane at right angles to the plane at which tape is released into the head engagement path by the first guide means, said flat guide surface being engagable with an edge of the tape prior to movement along said head engagement path for checking lateral movement of the tape in its plane in the direction of said flat guide surface during movement along said head engagement path, and an input tape director in said feedpath in advance of said first and second guide means for maintaining the tape height such that the wrap of the tape around the first guide means is symmetrical, and means for applying resistance to the movement of the tape so as to cause the tape extending along said feed and head engagement paths to be maintained under tension when engaged by the tape drive means.

The invention embodied in the above defined device recognizes that, in the case of an open-loop head-configuration, the tape will follow a natural path from a release-point over the tape-heads to the drive-mechanism; and further, that the natural path will provide ideal alignment, without additional guidance, provided that the tape is properly released into that path. The invention additionally recognizes that proper release involves the following:

a cylindrical guide-post at the release-point around which the tape is tensioned symmetrically, and which has an axis predictably perpendicular to a reference-plane on the machine with which it is intended for use, a tensioning device preceeding the cylindrical guide, which serves to maintain the tape in uniform and linear contact with a linear segment of the cylindrical guide surface, and a flat guide, having a surface parallel to the reference-plane of the machine and predictably spaced from it, which makes contact with the edge of the tape at the point where the tape is curved around the cylindrical guide-post.

This combination has been found to assure consistently superior alignment to any other method of release. The embodiments described are capable of inexpensive and precision manufacture, so that each time the device is engaged with a machine, the tape-release components will predictably assume their correct position relative to the reference-plane of the machine, without individual adjustments as required in some attempts to solve the problems, and without vulnerability to wear and mishandling.

The invention will now be further described with reference to the accompanying drawings in which:

FIGS. 1 and 2 are planned views of two similar tape guidance devices according to the invention each with the cover partly cut away.

Figure 3:
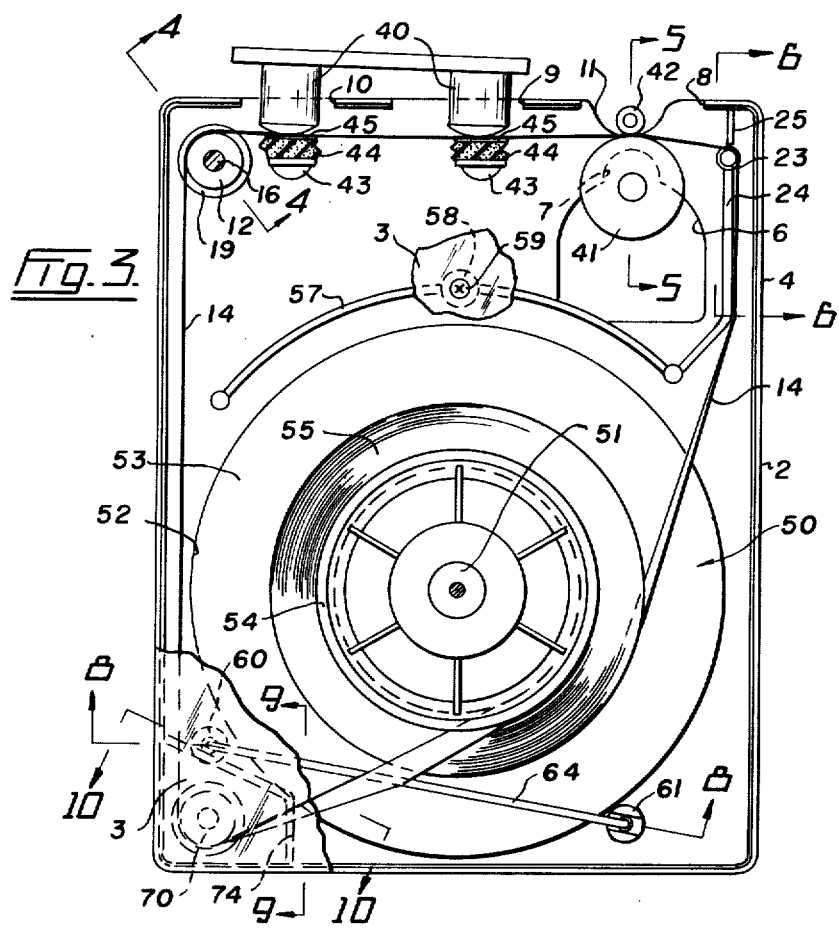
FIG. 3 is a planned view of an endless tape cartridge according to the invention with the cover partly cut away.

FIGS. 4 to 7 are sectional elevations of details on the lines 4—4, 5—5, 6—6 and 7—7 of FIGS. 1, 2 and 3.

Figure 8:
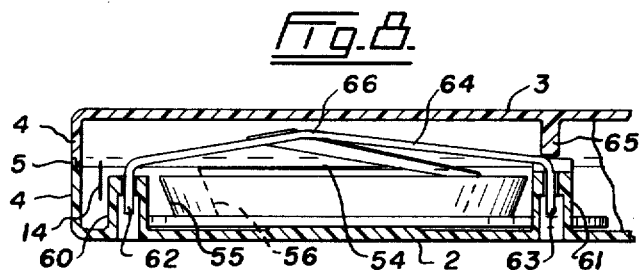
Figures 9, 10:
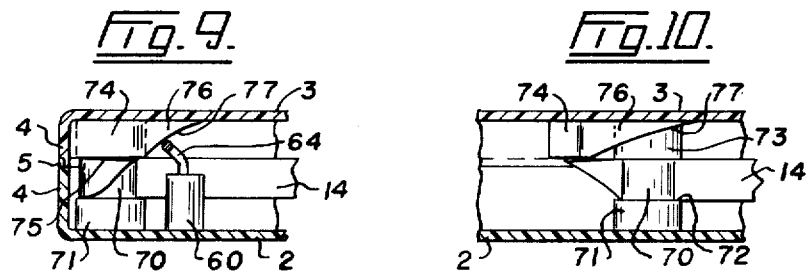
Figure 7:
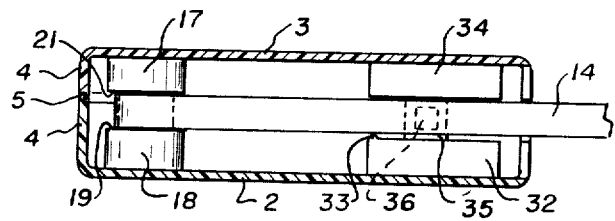

FIGS. 8, 9 and 10 are sectional elevations of details on the lines 8—8, 9—9 and 10—10 of FIG. 3.

Figure 11:
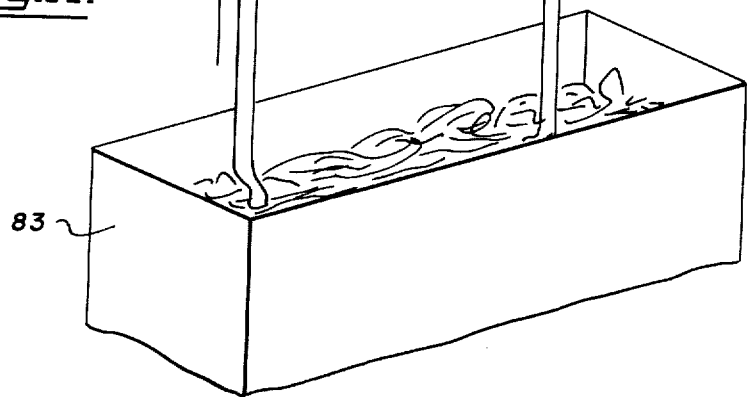

FIG. 11 is a perspective view of the device of either FIG. 1 or FIG. 2 in a modified form in use with tape received from and returned to a tape storage reservoir.

Referring first to FIGS. 1 and 2, the devices therein shown each comprise a housing having a base portion 2 and a cover portion 3. The portions 2 and 3 have sidewalls 4 which interengage at complementary stepped edges 5 best seen in FIGS. 4 to 7. Each base portion 2 is provided with a generally semi-circular aperture 6 having a semi-circular recess 7 at one end thereof. Also, at the front end of the device adjacent to the opening 6, the walls 4 are cut away to provide openings 8, 9 and 10. Both the base portion 2 and cover portion 3 are provided with arcuate edge recesses 11 juxtaposed in relation to the recess 7. The purpose of the openings and recesses 6 and 11 will be described below.

At the left hand front corner of each device, the base portion 2 has integrally molded therewith a guide post 12 defining a cylindrical guide surface 13 for a magnetic tape shown at 14. The post 12 is formed with a central bore 15 which receives in engagement therewith a spigot 16 extending from an inverted post 17 molded integrally with the cover portion 3 as best seen in FIG. 4. The post 12 has an enlarged lower portion 18, the upper surface of which defines an annular step 19 comprising a second guide surface for the tape. The surface of the step 19 lies at right angles to the axis of the post 12 and serves to maintain the tape 14 at the height of the step by engagement with the lower edge 20 thereof. The lower face of the post 17 on the cover 3 also forms a step 21 which serves as a curb for preventing the tape from rising during movement around the guide post 12.

At the right hand front corner of each device, the base portion 2 has a tape director post 23 (see also FIG. 6) molded integrally therewith, with a wall 24 extending rearwardly therefrom parallel to the adjacent sidewall 4. Also as seen in FIG. 6, the post 23 has a web 25 extending from the front thereof to the front wall 4 of the cartridge, the upper edge of the web 25 being at a lower level than the upper edge of the wall 24. The cover 3 has a spigot 26 molded integrally therewith which engages in a hollow bore in the post 23, the spigot 26 having a web 27 extending forwardly therefrom in vertical alignment above the web 25. The webs 25 and 27 define between them a gap sufficiently high to permit the tape 14 to move therethrough without impediment. This gap also serves to support the length of the tape extending from the step 19 for engagement between the pinch roller and capstan. The wall 24 extends to the rear of the device and serves, together with the adjacent wall 4 to define a passage which confines the tape during its continued movement.

At the rear of the device, the walls 4 are apertured at the two corners to provide a tape inlet 30 and a tape outlet 31, the tape outlet 31 being at the end of the passage defined by the walls 24 and 4. Between the inlet 30 and the post 12, an input tape director 29 is provided consisting of a platform 32 molded integrally with the base portion 2 and having at the leading end a raised lip 33 set at the same height as the step 19 on the post 12. The lip 33 functions to maintain the tape 14 at a height such that the wrap of the tape around the post 12 is symmetrical. Immediately above the platform 32, the cover portion 3 has molded integrally therewith a block 34 which serves as a tape curb for controlling the tape during movement between the platform and block. The block 32 is also provided with a pair of upstanding posts 35 having parallel inner faces between which the tape 14 passes. One of the posts 35 has adhered to the inner face thereof a pad 36 of soft polyfoam of greater thickness than the spacing between the posts. The pad 36 is provided with a facing membrane 37 which presses the tape 14 against the surface of the other post 35 to apply a predetermined pressure thereto so that the tape is maintained under tension during subsequent movement through the device.

Towards the rear of the device, the base portion 2 is provided with a further post (not shown) which is drilled and threaded and the cover portion 3 is provided with a downwardly extending post 38 which is counter sunk to receive a screw 39 extending therethrough into the post in the base portion 2 so as to retain the two portions of the device in engagement.

When located in co-operating engagement with a recording/playback machine, the record/playback heads 40 of the machine extend through the apertures 9 and 10 into engagement with the tape 14. At the same time, a pinch roller 41 is raised through the aperture 6 and located in the semi-circular recess 7. The pinch roller 41 nips the tape against a capstan 42 located in the recess 11. In cases where the record/playback heads 40 of the machine are disposed at a divergent angle as seen in FIG. 1, the divergency produces an automatic wrap around of the tape on the heads which automatically maintains correct tape alignment and control. All that is required is a curb wall 42 which prevents the tape from forming a large loop in the center of the device when not engaged with the machine.

Where, however, the device is intended for use with a machine in which the record/playback heads are in parallel alignment, as shown in FIG. 2, it is necessary to provide means within the cartridge for effecting the desired wrap around. As shown in FIG. 2, a pair of upstanding semi-circular posts 43 are molded integrally with the base portion 2. On the flat surface of each of these posts, a block of compressible cellular plastics material 44 is provided, each block 44 being faced with a membrane 45 of material presenting a low frictional resistance to the tape 14.

The material of the blocks 44 is preferably a polyfoam according to grade No. USU-39 of Canada Cellular Products Standard No. 1 dated Oct. 4, 1967. The membrane 45 is preferably a Teflon (Registered Trade Mark) membrane having a thickness of 0.0007 inches to 0.001 inches. With this combination, the bulk resistance to splices is very low in the tape passing between the record heads 40 and the blocks 44.

Referring now to FIG. 3, this shows a modification of the device of FIG. 2 in the form of an endless tape cartridge and where the same features occur, they are identified by the corresponding reference numerals. The following description is confined to the features peculiar to the endless tape cartridge. It will be noted that the sectional elevations shown in FIGS. 4, 5 and 6 also apply to FIG. 3.

As will be seen from FIG. 3, the housing cover and base portions 2 and 3 forming the cartridge are of greater longitudinal extent than in the device of FIG. 2 so as to provide a tape storage area generally indicated at 50. Within the tape storage area 50, the base portion 2 has a journal post 51 molded integrally therewith and mounting a tape storage reel 52 having a base 53 and a core 54 on which a body 55 formed from the tape 14 is wound. As best seen in FIG. 8, the core 54 is upwardly flared at 56 so that the inner turn of the tape can assume a similar configuration in the body 55.

The wall 24 extending from the post 23 does not in this embodiment extend to the rear of the cartridge but diverts to connect with a wall portion 56 extending generally radially in relation to the reel 20. The wall portion 56 in turn connects with a wall 57 forming part of a segment of a circle and defining in part a chamber for the reel 52. At a position on the center line of the cartridge, the wall 57 incorporates a screw threaded hollow post 58 in which a screw 59 engages, the screw 59 extending through a countersunk boss molded integrally with the cover 3. The journal post 51 may similarly comprise a screw threaded bore to receive a retaining screw extending through the cover in a similar way.

Between the journal post 51 and the rear end of the cartridge, a pair of upstanding hollow posts 60 and 61 are molded integrally with the base portion 2. These posts receive the ends 62 and 63 of a non-magnetic stainless steel wire bridge member 64 of a somewhat arched configuration. The bridge member 64 is retained in position by a molded projection 65 extending downwardly from the cover portion 3 directly above the post 61, as best seen in FIG. 8. The bridge member 64 straddles a segment of the reel towards the rear of the cartridge and is formed with a central apex 66.

In the left hand rear corner of the cartridge, a vertical cylindrical post 70 is molded integrally with the base portion 2 and is formed with a lower part 71 of greater diameter so as to define a step 72 of the same height as the step 19. The post 70 is hollow and receives therein a spigot formed on an inverted post 73 molded integrally beneath the cover 3. The cover 3 is also formed with a dependent tape guide web 74 extending longitudinally of the cartridge adjacent to the post 70, the web 74 having a horizontal lower edge 75. The end of the web 74 is connected to the end of a second web 76 which extends at an angle in front of the post 70 to the left hand wall 4. The web 76 is formed with an inclined lower edge 77 extending upwardly in a curve from the end of the edge 75 to the wall 4 so as to provide a clearance from the bridge member 64.

The configuration of the path of the tape 14 will now be described. The tape is drawn from the tape body 55 adjacent to the core 56 and passes over the bridge member 64 to the left of the apex 66 thereof. The bridge member 64 insures that the tape is maintained clear of the tape body 55 remaining on the reel and at the same time, due to its arched configuration, it initiates the reorientation of the tape into a vertical plane. The tape then passes beneath the edge 75 of the web 74 and around the post 70 which completes the orientation into a vertical plane. The post 12 then receives the tape from the post 70, the span between the two posts permitting the tape to settle by gravity onto the step 19. The post 12 directs the tape across the membranes 45 of the pads 44 and around the post 23 between the webs 25 and 27. Finally, the tape extends from the post 23 between the wall 24 and the right hand wall 4 of the cartridge and is re-wound on the outside of the body 55 of tape. As shown in FIG. 3, when the cartridge is engaged with a recording/playback machine, the tape leaving the guide post 12 extends between the record/playback heads 40 and the pads 44 and is driven by the capstan 42 engaging with the pinch wheel 41. Tension in the tape is maintained by the frictional resistance developed at members 64, 74 and 70, after withdrawal of the tape from the center of the reel.

Referring now to FIG. 11, this shows a device according to either FIGS. 1 or 2 in a slightly modified form. As shown, the rear end of the device is provided with a rearwardly extending platform 80 integrally molded as an extension of the base portion 2. The platform 80 has a rolled rear edge 81 over which the tape 14 can run to and from the inlet and outlet 31 respectively when the device is mounted on the deck 82 of a recording/playback machine. This arrangement permits the use of the device with a large and variable quantity of tape contained in a storage container indicated at 83.

What is claimed is:

1. A magnetic tape guidance device for co-operating engagement with a recording/playback machine, said device comprising:

a housing adapted to be located in a predetermined position in the machine, and formed for the reception of record/playback head means and tape drive means of the machine into engagement with magnetic tape within the housing, said drive means being adapted to draw the tape over the head means in a first predetermined plane and with an edge of the tape in a second predetermined plane normal to said first plane, fixed planar guide means fixed against movement relative to the housing and located in said second plane for guiding said edge of the tape in said second predetermined plane, a fixed wrap-around guide surface fixed against movement relative to the housing and located at said planar guide means and extending normal thereto for guiding said tape into said first predetermined plane, said guide means and said guide surface forming a tape guiding unit and being positioned in the housing to guide the tape from a feed path into a head engagement path extending past the head means in the first plane to the drive means with said housing defining a tape engagement zone for the record/playback head means which is free of rigid tape guidance elements engaging either the planar sides or the edges of the tape between said guiding unit and the position of engagement by the tape drive means, said fixed elements of the guiding unit comprising a means for applying a resistance to movement of the tape as it moves thereabout to apply tension to the tape in the head engagement zone, an input tape director means in said feed path in advance of said guiding unit for directing the tape into said feed path to the guiding unit with said edge of the tape in the second plane for assuring that said edge of the tape remains in the second plane after the tape has passed over said wrap-around guide surface, said input director means including means for applying a resistance to the movement of the tape thereat to apply tension to the tape in the feed path.

2. A magnetic tape guidance device as claimed in claim 1, wherein said guide surface comprises a cylindrical post formed integrally with said housing, and said planar guide means comprises a step formed on said post.

3. A magnetic tape guidance device as claimed in claim 2 and further comprising a first tape curb provided at the top of said cylindrical post in spaced relation from said step to check movement of the tape away from said step.

4. A magnetic tape guidance device as claimed in claim 1 and further comprising tape curb means surrounding said head engagement path for loosely locating the tape, whereby the tape can be readily engaged by the drive means upon location of the device in the machine.

5. A magnetic tape guidance device as claimed in claim 1 and further comprising resilient pressure pad means for maintaining the tape in engagement with the head means when the device is located in the recording/playback machine.

6. A magnetic tape guidance device as claimed in claim 5, wherein each pressure pad is made from polyfoam according to Canadian Cellular Products Standard Grade No USU-39, each pressure pad being provided with a low friction surface membrane having a thickness within the range of 0.0007 to 0.0010 inches.

7. A magnetic tape guidance system as claimed in claim 6, wherein said membrane is made of Teflon.

8. A magnetic tape guidance device as claimed in claim 1, wherein said means for applying resistance at the input tape director means comprise a pressure pad pressing said tape against a guide surface whereby said tape is tensioned.

9. A magnetic tape guidance device as claimed in claim 1, and further comprising an output tape director for receiving tape from the drive means and directing the tape to a tape storage.

10. A magnetic tape guidance device as claimed in claim 1, wherein said housing defines a tape storage space separated from said engagement path, said device also comprising an output tape director for directing tape received from said drive means into said tape storage space at an angle to the walls thereof.

11. A magnetic tape guidance device as claimed in claim 1, and further comprising a tape storage reel mounted for rotation in said housing, said input tape director being positioned for receiving tape from the center of said reel and directing said tape towards said guiding unit, under tension generated both by the frictional resistance at the point of tape withdrawal from the reel and additionally by the resistance applied at the input director, a bridge member for holding the tape clear of the upper face of the reel during movement towards said input tape director, and means for receiving tape from the drive means and directing said tape for reeling on said reel during rotation thereof produced by the withdrawal of tape from the center.

12. An endless magnetic tape cartridge for use in a horizontal position with a recording/playback machine to direct tape from a storage reel within the cartridge along a path for sequential engagement by record/playback heads and drive means provided on the machine in alignment at the same height, said drive means being adapted to draw the tape over the heads in a first predetermined plane and with an edge of the tape in a second predetermined plane normal to the first plane, said cartridge comprising:

a housing dimensioned and ported for co-operation with the record/playback machine, fixed planar guide means fixed against movement relative to the housing and located in said second plane, a fixed wrap-around guide surface fixed against movement relative to the housing and located at said planar guide means and extending normal thereto for guiding said tape into said first predetermined plane, said guide means and said guide surface forming a tape guiding unit and being positioned in the housing to guide the tape from a feed path along said engagement path in the first plane over the record/playback head when the housing is located in the machine and the tape engaged by the drive means, said engagement path being free of rigid guidance elements engaging either the planar sides or the edges of the tape between said guiding unit and said drive means, said fixed elements of the guiding unit comprising a means for applying a resistance to movement of the tape as it moves thereabout to apply tension to the tape in the head engagement zone, an input tape director means in said feed path in advance of said guiding unit for directing the tape into said feed path to the guiding unit with said edge of the tape in the second plane for assuring that said edge of the tape remains in the second plane after the tape has passed over said guide surface, said input director means including means for applying a resistance to the movement of the tape thereat to apply tension to the tape in the feed path, a tape storage reel mounted for free rotation within said housing, said reel having a base flange and an outwardly flared core upstanding from the base, whereby tape can be wound on the reel when discharged from the drive means and withdrawn from the reeled body of tape thus formed at a position adjacent the core under frictionally generated tension, and a bridge member for constraining the tape withdrawn from the reel into a path clear of the upper surface of the tape on the reel and into engagement with said input tape director.

13. A cartridge as claimed in claim 12 and further comprising resilient pressure pad means for maintaining the tape in contact with said record/playback heads when the cartridge is mounted in the record/playback machine.

14. A cartridge as claimed in claim 12 wherein said bridge member comprises an arched element straddling a portion of said reel.

15. A cartridge as claimed in claim 14, wherein said arched element comprises a non-magnetic wire member having dependent ends retained in hollow posts in said housing.

16. A cartridge as claimed in claim 12, wherein said housing comprises a base portion having hollow upstanding elements, two of which constitute said guide surface and said input tape director, and a cover portion having dependent spigots frictionally engageable in said hollow upstanding elements to retain the base and cover portions in coincidence.

17. A cartridge as claimed in claim 12, and further comprising an endless magnetic tape wound on said reel and extending past said bridge member, input tape director and the guiding unit.

18. A cartridge as claimed in claim 12 in which said input tape director comprises a first stepped post in said feed path and spaced from said guiding unit, said stepped post being fixed against movement relative to the housing and hence constituting said means for applying resistance at said input tape director, the step of said stepped post being positioned substantially in said second plane.

19. A cartridge as claimed in claim 18 in which said edge of the tape is the lower edge thereof, and said input tape director is sufficiently spaced from the guiding unit to permit the tape to settle by gravity onto the planar guide means.

* * * * *